(12) United States Patent
Chien

(10) Patent No.: US 7,726,839 B2
(45) Date of Patent: Jun. 1, 2010

(54) LED LIGHT DEVICE WITH CHANGEABLE FEATURES OF GEOMETRIC DIMENSION

(76) Inventor: Tseng-Lu Chien, 8F, No. 29, Alley 73, Lin-Shen Road, Shi-Chi Town, Taipei Hseng (TW)

(*) Notice: Subject to any disclaimer, the term of this patent is extended or adjusted under 35 U.S.C. 154(b) by 0 days.

(21) Appl. No.: 12/003,691

(22) Filed: Dec. 31, 2007

(65) Prior Publication Data

US 2008/0259632 A1    Oct. 23, 2008

(51) Int. Cl.
*F21V 21/26*    (2006.01)
(52) U.S. Cl. .................. 362/249.03; 362/249.07; 362/249.09
(58) Field of Classification Search ............. 362/102, 362/565, 800, 249.01–249.09, 234, 418, 362/419, 285, 388
See application file for complete search history.

(56) References Cited

U.S. PATENT DOCUMENTS

| 5,954,417 A | * | 9/1999 | Mai ........................ 362/102 |
| 7,354,180 B2 | * | 4/2008 | Sawhney et al. ........... 362/388 |

* cited by examiner

*Primary Examiner*—Bao Q Truong
(74) *Attorney, Agent, or Firm*—Bacon & Thomas, PLLC

(57) ABSTRACT

An LED light device with changeable geometric dimensions includes at least one LED installed within each of a plurality of housing-units connected by connectors which deliver electric signals from a power source to desired LEDs.

4 Claims, 6 Drawing Sheets

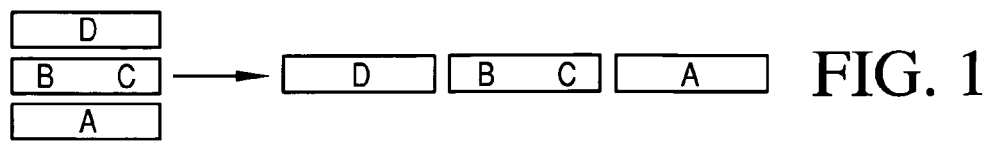
FIG. 1
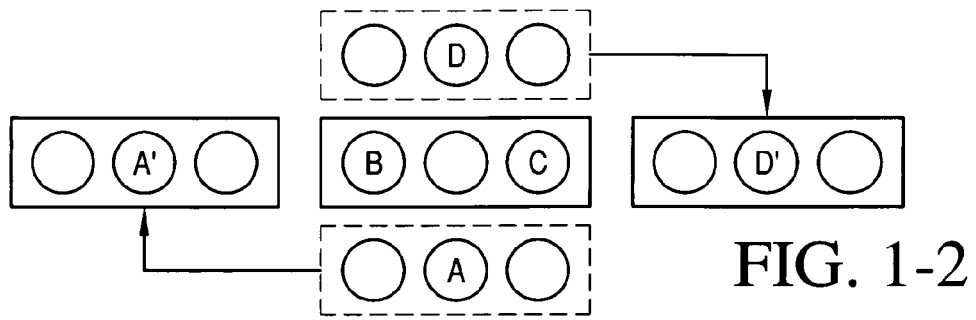
FIG. 1-2
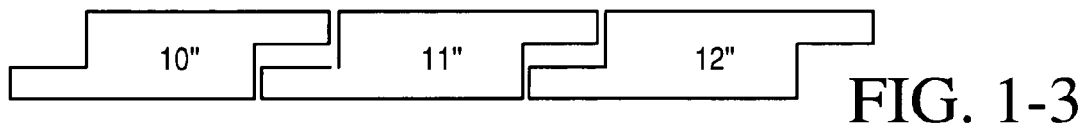
FIG. 1-3
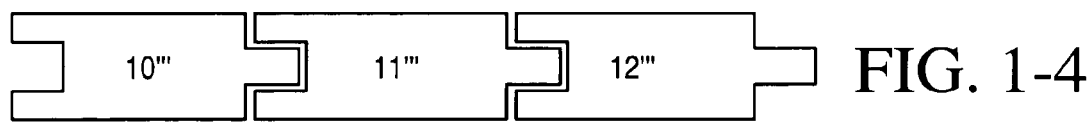
FIG. 1-4
FIG. 2
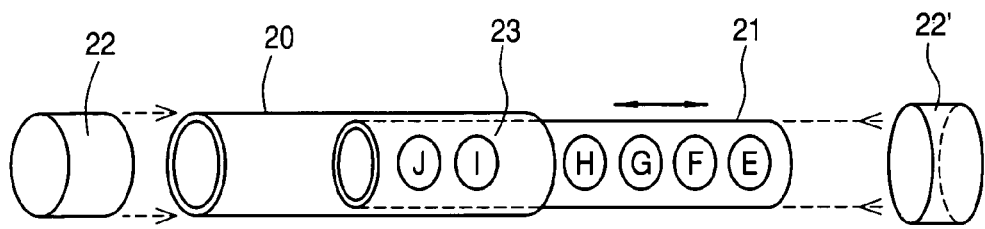
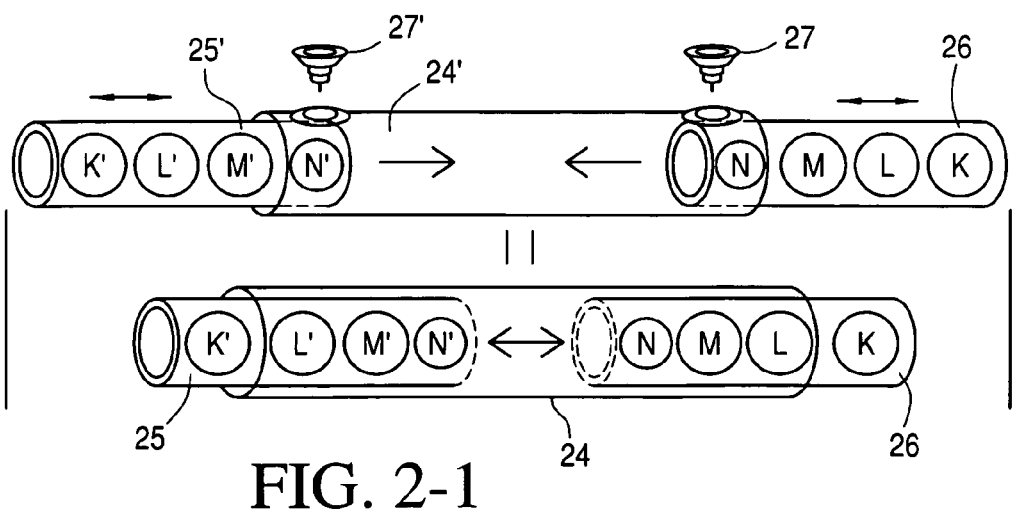
FIG. 2-1

FIG. 3
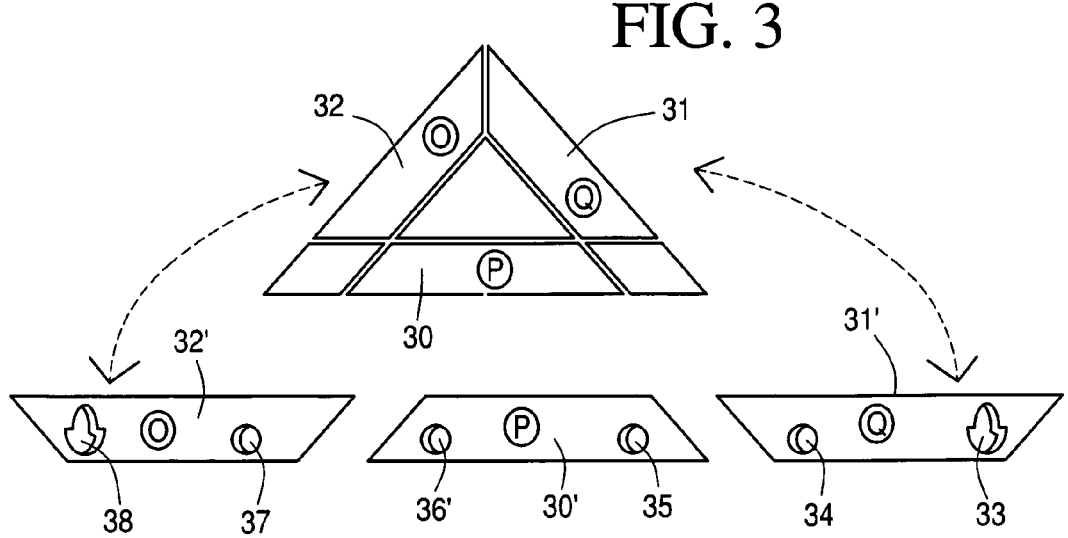
FIG. 3-1
FIG. 4
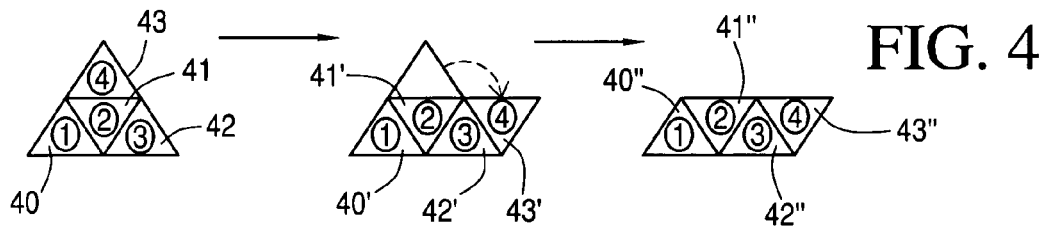
FIG. 5-1
FIG. 5-4
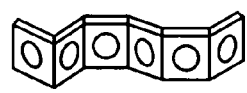
FIG. 5-2
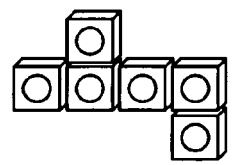
FIG. 5-5
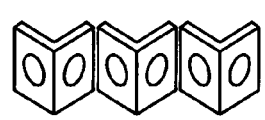
FIG. 5-3

FIG. 5-6 (5 LEDs)
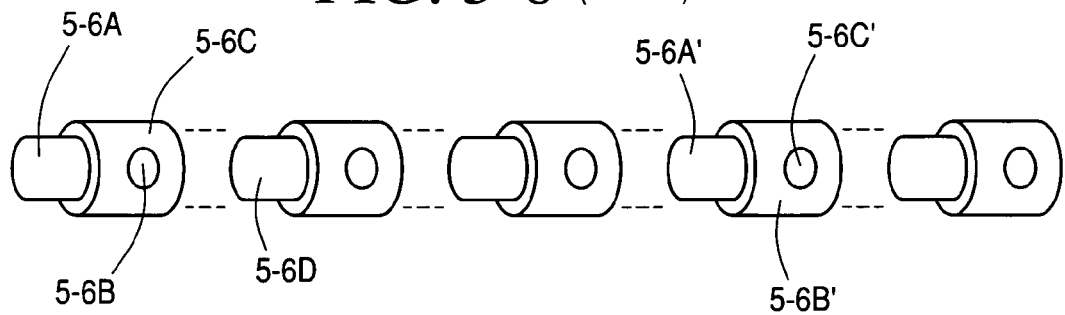
FIG. 5-8
FIG. 5-7 5 LEDs
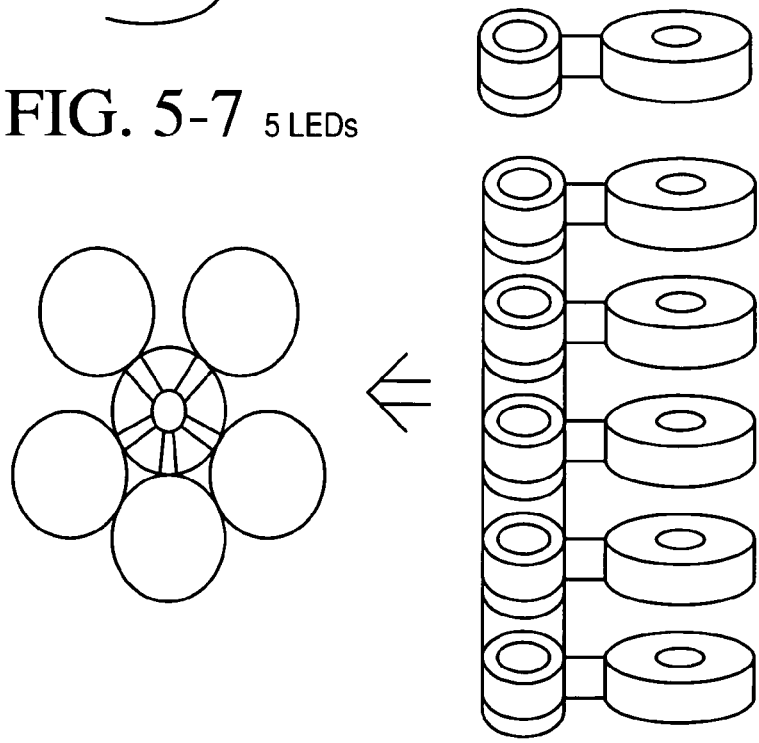

LED LIGHT DEVICE WITH CHANGEABLE FEATURES OF GEOMETRIC DIMENSION

This application has subject matter in common with copending U.S. patent application Ser. Nos. 12/003,809 ("LED light with changeable features"); 11/806,711 ("Multiple LED light with adjustable angle features"); 19/883,747 ("Fiber Optic light kits for footwear"); 11/092,741 ("Night light with fiber optics"); 11/094,215 ("LED Night light with Liquid optics medium"); 11/255,981 ("Multiple light source Night Light"); 11/498,881, ("Poly Night light"); 11/527,631 ("LED Night light with interchangeable display unit"); 11/498,874 ("Area Illumination for LED night light"); 11/527,629 ("Time Piece with LED night light"); 11/527,628 ("Multiple Function Night light with Air Freshener"); and 11/806,284 ("LED Night light with more than one optics medium").

BACKGROUND OF THE INVENTION

The current invention is an improvement over conventional LED light device available in the market place, which are limited to a fixed shape, fixed illumination areas, fixed brightness, fixed viewing angle, fixed design, and a size that is unsuitable for different locations. At present, there is no LED light device can fit anywhere, with a scalable brightness and illumination area, that is bendable to form a wine rack under a cabinet, and that has additional hook functions to hang any items inside a kitchen, living room, bathroom, kids room, entertainment room, garden, patio, boat, car, van, bus, truck, train, airplane, transportation equipment, playground, and/or anywhere outdoors. Accordingly, for reasons of economics and environment concern, an LED light device is needed which has the ability to change its geometric shape to fit anywhere people want power saving LED light kits. The preferred embodiments of the current invention all have optional properties to allow people to create LED light devices having different appearances for a required brightness, including different illumination areas and a self-designed light device shape. Common parts for the housing-unit and connector-unit can form standard equipment to avoid too much plastic, LEDs, or circuit waste to ruin the environment. This is a very green concept made possible by the LED light device of the current invention.

In addition, the current invention provides an LED light device in which the LEDs' orientation, position, or light emitting direction can be changed with its geometricdimensions, thereby allowing the user to create a flexible and changeable shape, dimension, size, position, orientation, illuminated areas, viewing angle, light device value, and light device light photometric performance, to enable the light device to have a universal fit for all kinds of installation areas for different available spaces to improve conventional LED light kits which are limited to a fixed shape, illumination, narrow beam direction and other defects.

The current invention may be incorporated in a connector which has the function of connecting each of a plurality of housing members to change the geometric dimensions of the light device.

BRIEF DESCRIPTION OF THE DRAWINGS

FIGS. 1, 1-2, 1-3, 1-4, 2, 2-1, 3, 3-1, and 4 show a preferred embodiment 1 of an LED light device with changeable geometric dimension that is incorporated with desired housing members and connector means to provide desired combinations of different orientation, position, light emitting direction, light device's shape, dimension, size, illuminated areas, viewing angle, light device value, and light device light photometric performance.

FIGS. 5-1, 5-2, 5-3, 5-4, 5-5, 5-6, 5-7, and 5-8 shows the preferred embodiment 1 of an LED light device in which all of the housing units and connector means are identical so that a desired number of the "same" housing units and connector means can be combined to provide a desired geometric dimension of the light device.

FIGS. 7, 8, and 9 shows an embodiment 3 also disclosed in a co-pending application Ser. No. 12/003,809 ("LED light device with changeable features"), which has features of current invention in that the preferred embodiment 3 also incorporates a desired number of housing members and connector means to enable the user to create a desired combination of orientation, position, light emitting direction, light device's shape, dimension, size, illuminated areas, viewing angle, light device value, and light device light photometric performance,

DETAILED DESCRIPTION OF THE PREFERRED

Embodiments

Figure 7:
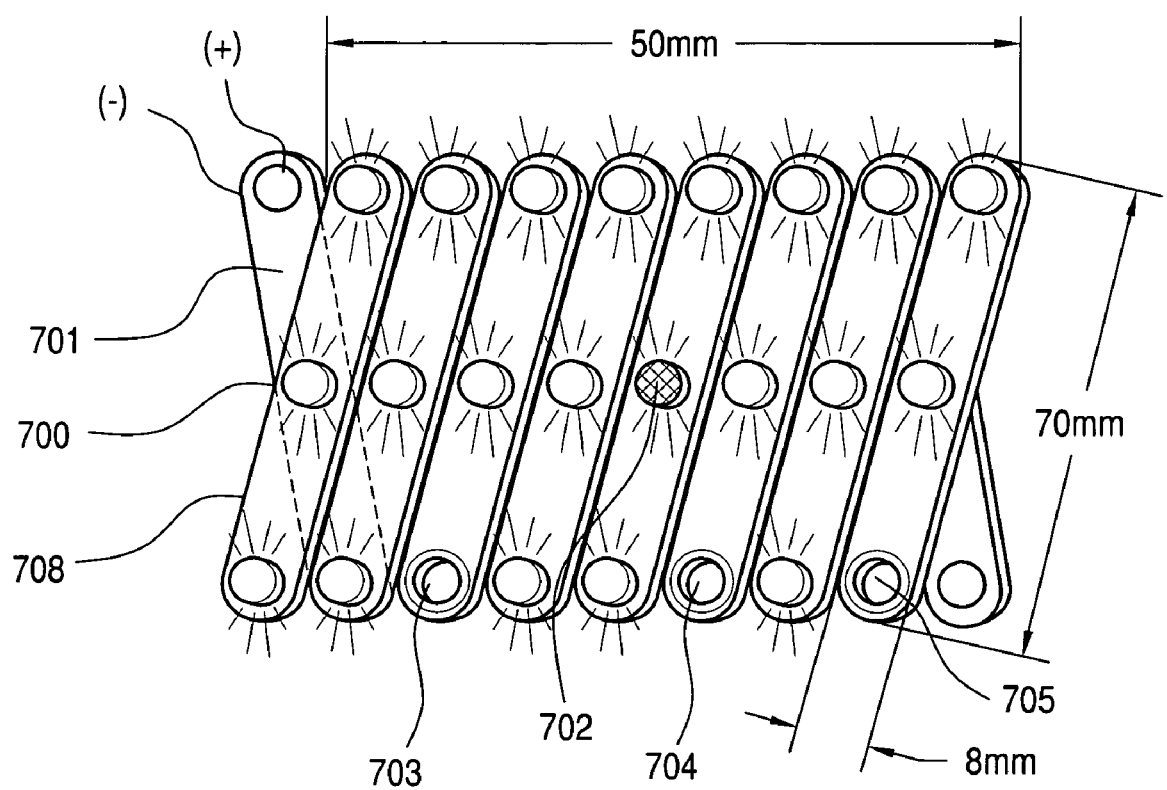

FIGS. 1-2, 1-3, and 1-4 show housing-units (10) (11) (12), each having a desired number of LEDs (A) on the housing-unit (10), LEDs (B) and (C) within the housing-unit (11), and an LED (D) fixed on the housing-unit (12). The housing-units (10) (11) (12) are arranged side-by-side and four LEDs form a "parallelogram." The four LEDs emit light beams that form a "parallelogram" to be seen by a viewer. The housing-units (10, 11, 12) in FIGS. 1-2 can be rearranged as indicated by (10', 10", 10''') (11", 11''') (12", 12''') by dashed lines in FIGS. 1-2 and in FIGS. 1-3 and 1-4 to change the LEDs' (a) orientation, (b) position, and/or (c) light emitting direction, and the light device's (d) shape, (e) dimension, (f) size, (g) illuminated areas, (h) viewing angle, (i) value, and/or (j) photometric performance while the housing-units (10) (12) changed position to the housing-unit (10') (12').

For example, FIGS. 1-2 shows rearrangement of the housing-units (12) (11) (10) from vertical (y-axis) side-by-side orientation to horizontal (x-axis) (10) (11) (12) side-by-side orientation. The four LEDs go from a "parallelogram" (D) (B) (A) (C) arrangement to a "linear" (A) (B) (C) (D) arrangement. This shape flexibility, together with performance flexibility as described below, enables the LED light device of the current invention to have wide application to different locations in a house, vehicle, boat, transportation equipment, place, building, park, or location for live animals, whether indoors or outdoors.

The changeable features of each housing-unit, LED, or light device is not limited to the preferred embodiments illustrated herein. It will be appreciated that the current invention covers all equivalent structures or functions which can be rearranged or changed in any way imaginable by a user and that all housing units or LED units that can be changed from an original arrangement to a new arrangement may still fall within the scope of the current invention.

In the example of FIGS. 1-3, housing-units (10") (11") (12") preferably incorporate connector-means to deliver electricity from a desired power source to each LED for desired illumination according to a pre-determined light performance. The housing-units of this embodiment may incorporate circuit means which may be selected from any desired combination of an integrated circuit (IC), electric components, sensor means, switch means, conductive means, conductive resilient members, conductive springs, conductive wires, and conductive metal pieces designed to deliver a desired electric signal. The connector means incorporate circuit means which can deliver the electric signals from one housing-unit to other desired housing-units, the circuit means being selected from conventional market available elements that deliver electricity from one end to other ends, and which may elements that are rotatable, able to jump a gap, extendable, foldable, extend a desired distance, extractable, connectable, disconnectable, extendable, retractable, expendable, addable, adjustable, bendable, overlapable, underlayable, assemblable, disassembleable, and/or flexible. Various suitable connector designs are disclosed in the above-cited co-pending patents.

As shown in FIG. 2, the light device may be extendable, for example in the form of an elongate bar, tube, rod, or stick that is adjustable over a desired length range (maximum length and minimum length) and to provide a desired number of LEDs, light beam direction, light performance, and illumination area, and which may also have additional functions achieved by providing holes, hooks, hangers, sensor-means, switch-means, a power source, adjustment-means, attachment means, replacement means, or an extended bar, stick, tube, hook, rod. The extendable light device can fit in a wide space and is not limited to a fixed length such as 6", 12", 18", 24", 36" to provide a big display space for stores. It also solves the consumer problem because the current LED light device will not fit a wide range of space. This is the best design for a universal LED light device. For example, the preferred LED light kits can have a length range of 6" to 12" and 12" to 24", or more. Still further, the LED light device of FIG. 2 may have a desired combination of the properties including properties that not only make the light device extendable, but also foldable, retractable, expendable, addable, adjustable, bendable, overlapable, and/or underlayable.

As shown in FIG. 2, the outer housing-unit (20) has a bigger diameter than the inner housing-unit (21). The inner housing-unit (21) and outer housing-unit (20) both have several LEDs on the elongate length with end caps (22) and (22') to attach to two walls after adjustment of the length. The LEDs (E) (F) (G) (H) (I) (J) will turn on to exhibit a pre-determined light performance as described above.

FIGS. 2-1 shows extendable and retractable tubes (24) (25) (26) having a shorter length. The inner tube (25) has four LEDs (K') (L') (M') (N') and the other inner tube (26) has four LEDs (K) (L) (M) (N). Both of the inner tubes (25) (26) are within the bigger tube (24). At the shortest length of the LED light kit, only two LEDs (K) (K') can be seen by the viewer. All eight LEDs will be seen by the viewer when the inner tubes (25') (26') are extended to the longest length of the LED light device. The connector-means for this preferred embodiment is a screw type with desired construction to fix the length and offer the electric signal to all eight LEDs for desired light performance.

FIG. 3 shows a preferred embodiment of and LED light device which includes three housing-units which overlap and underlay a middle piece. This embodiment of the current invention provides LED light kits having changeable geometric functions and, in addition, rotary, jumpable gap, extendable, foldable, distance changeable, extractable, connectable, dis-connectable, extendable, retractable, expendable, addable, adjustable, bendable, overlapable, underlayable, assemblable, disassemblable, and/or flexible properties. The two pieces of the housing-unit (31) (32) are overlapped and underlay of the middle housing-unit (30) to form a triangular geometric shape (32) (30) (31), which can be rearranged to become a straight line (32') (30') (31') geometric shape arrangement upon bending housing-unit (32) toward the left housing-unit (32') and the housing-unit (32) toward the right housing-unit (31'). The housing-unit (32') has a desired number (0) of LEDs within the housing-unit (32'). The number of LEDs can be any number from one to N, and may be connected with circuit means to exhibit a desired light performance as discussed above. The housing-units (32') (30') (31') also can have additional functions as discussed above.

Figure 8:
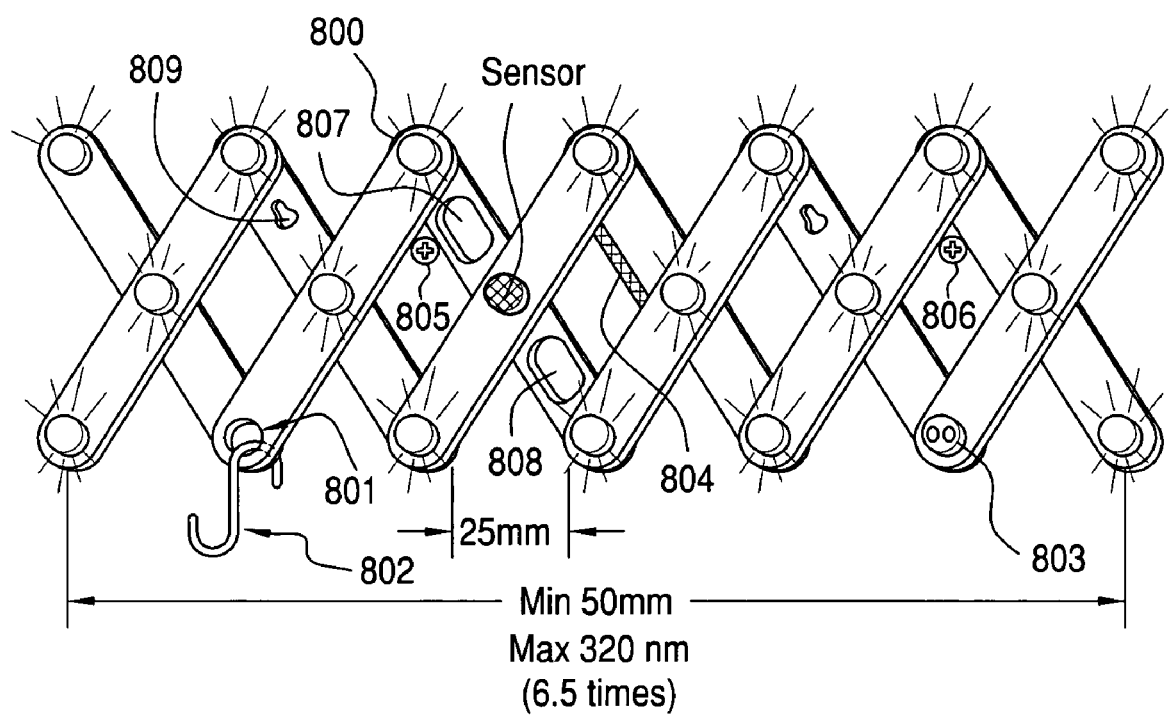

For example, as shown in FIG. 8, the housing-unit may include telephone holes (38) (33) can offer an easy and quick installation on the wall. Other holes (34) (35) (36) (37) can also incorporate attachment means selected from glue, double-side tape, foam tape (804), hook and loop tap, chemical adhesive material, screws (805) (806), a phone hook and catch (809) (809'), holes (807) (808), rivets, or a hold tray with attachment means for attaching the light device to main objects at locations such as cabinets, closets, a garage, walls, and/or furniture of a house, car, van, or transportation equipment.

As shown in FIG. 4, the preferred embodiment of an LED light device having four pieces forms an "Equilateral Triangle" (40) (41) (42) (43) and each equilateral triangle is connected together by connector-means (not shown) that deliver an electric signal from a power source (not shown) to each of the LED(s) (1) (2) (3) (4) within each equilateral triangle (40) (41) (42) (43) to provide a desired light performance.

This embodiment also provides expandable, assembleable, bendable, flexible, deformable, and addable properties. For example, each added equilateral triangle and connector-means can expand the size, length, brightness, dimension, light output, illumination area, and viewing angle of the light device. The big triangle made up of four housing-units (40) (41) (42) (43) which are in the form of the equilateral triangles (40) (41) (42) (43) can to a parallelogram shape arrangement (40") (41") (42") (43") by moving the equilateral triangle (43) to new position (43'). Each housing-unit is equal to one equilateral triangle.

FIGS. 5-1, 5-2, 5-3, 5-4, 5-5, 5-6, 5-7, and 5-8 show LED light devices which have the above-described properties selected from rotary, jumpable gap, extendable, foldable, distance, extractable, connectable, dis-connectable, extendable, retractable, expendable, addable, adjustable, bendable, overlapable, underlayable, assembleable, dis-assembleable, and flexible properties. Each of the light devices shown in FIGS. 5-1 to 5-7 includes housing-units and connector-means having a same basic geometric shape and construction, although there may be some difference in details such as LED numbers or other small details.

As shown in FIGS. 5-1 to 5-7, each housing-unit uses the same connector-means to connect each of the housing units. As shown in FIGS. 5-1 to 5-5, each housing number can have four sides to make a variety of geometric shapes such as the straight line arrangement of FIGS. 5-1 having six housing-units, the six piece opened square box arrangement of FIGS. 5-2 (the unfolded arrangement used to form the square box of FIGS. 5-2 being shown in FIGS. 5-3), The six piece curved shape of FIGS. 5-4, or the six piece triple "V" arrangement of FIGS. 5-5. Thus, a wide variety of applications can be provided by using a limited number of housing-unit shapes to create a lot of finished goods with different geometric shapes. This concept is similar to that of Lego Toys. As long as a proper circuit arrangement for the housing-units and connector-means is provided to allow the power source electric signal to be delivered from the power source to desired LEDs for a pre-determined light performance, the current invention can create a universal LED light device for people to use anywhere people stay. The same is true of the different shapes shown in FIGS. 5-6 and 5-7 and FIG. 5-8.

The current invention represents an improvement over conventional LED light devices that are limited by a fixed shape, fixed illumination areas, fixed brightness, fixed viewing angle, fixed design, and bad size for different locations. There is currently no LED light device that can fit anywhere, that has addable brightness and addable illumination areas, that is bendable to form a wine rack under a cabinet, and that can have additional hook functions to hang any items inside a kitchen, living room, bathroom, kid's room, entertainment room, garden, patio, boat, car, van, bus, truck, train, airplane, transportation equipment, play ground, and/or anywhere outdoors. Accordingly, for reasons of economics and environment concern, an LED light device is needed which has the ability to change its geometric shape to fit anywhere people want power saving LED light kits. The preferred embodiments of the current invention all have optional properties to allow people to create LED light devices having different appearances for a required brightness, including different illumination areas and a self-designed light device shape. Common parts for the housing-unit and connector-unit can form standard equipment to avoid too much plastic, LEDs, or circuit waste to ruin the environment. This is a very green concept made possible by the LED light device of the current invention.

FIG. 7 shows a third preferred embodiment which is extendable from a short length of 50 mm to, for example, a length of 320 mm. Thus, the length is extendable almost 6.4 times. Furthermore, in this embodiment, (a) the relative position of an LED with respect to other LEDs can be changed, (b) the device shape can be changed, (c) the light emitting direction, position, and areas can be changed, and (d) the number of LEDs also can be changed. The connector-means of this embodiment may include conventional parts such as a rivet, hinge, chain, or screw, metal parts, plastic parts, rings, rotating means, snap means, hook means, cover means, or press-tight means, but are not limited thereto. The light device can also use equivalent methods to get the same function and make the light device extendable to change size, and dimension, and geometric configuration. It will also be appreciated that each housing-unit may have different dimensions including length, width, thickness, shape, geometric design, finish, and marking so as not to be limited to one size. The device of this embodiment can be very small for infant toy use or very big, up to "China Great Wall" size. The current invention can have a desired size as long as proper dimensions are established for each housing-unit, so as to easily obtain desired features to use for all different spaces where human beings stay, including indoors and outdoors. Thus, even though this preferred embodiment is just a simple example having one dimension which is folded and extended from 50 mm to 320 mm range, the device can be made much smaller or larger, up to kilometers or miles in length.

The light devices of FIG. 7 and FIG. 8 may, per the above discussion, incorporate sensor means of a mechanical or electrical type selected from a photo sensor, motion sensor, timer, manual switch, humidity sensor, smoke sensor, heating sensor, magnetic sensor, and/or tilt sensor.

As shown in FIG. 7, the LED light device (700) has a top-grill housing-unit (708) and lower-grill housing-unit (701). The power source may be an alternating current power source or a battery power source depending on marketing requirements. The top housing-units (708) may have a desired number of LED installed within the housing-units (708). Each top housing-unit (708) and lower housing-unit (701) is connected by conventional electric conductive means which may include a conductive resilient means, conductive metal spring, conductive metal ring, conductive wire, and/or conductive metal piece to provide electricity delivery from the power source end (+) (−) of the first housing-unit to the last housing-unit and supply electricity to all the LEDs as desired in-series or in-parallel to meet marketing requirements.

It will be appreciated that the current LED light device may incorporate sensor means (702) such as a motion sensor and photo sensor to save power by only connecting the battery in response to motion or a predetermined light level. Any other type of sensor or switch may also be included as discussed above. For more practically, some locations (703), (704), (705) may include a hole with rotary features to install a hooks, post, bar, or electric device to provide the LED light device with more than just those of a light device. These additional holes can allow people to hang clothes or a jacket, hat, cap, bag, or even to use the circuit to charge the some batteries such as communication device, cellular phone device, or other computer device which uses a battery. It is simple to add a circuit means to convert power from the power source into a desired electric signal having a certain voltage and current to charge batteries for communication, computer, or consumer products.

FIG. 8 shows the same embodiment as FIG. 7, except that the LED light device has been extended to a longer length, from the 50 mm length shown in FIG. 7 to a length of 320 mm, and the connections between the lower housing-unit and the top housing-unit include different conventional connection-means as discussed above. In particular, the LED light device (800) shown in FIG. 8 may include attachment means selected from glue, double-side tape, foam tape (804), hook and loop tape, chemical adhesive material, a screw (805) (806), a phone hook and catch (809) (809'), a hole (807) (808), a rivet or a hold tray with attachment means.

According to FIG. 8, some of the flexible connection points (801) preferably lack an LED-unit and instead just use a rivet or equivalent connection-means so as to incorporate a pole, hook (802) or other metal or plastic device to allow the LED light device to offer other additional functions such as hanging a cloth, cap, hat, bag, or electric or non-electric device to enhance the function of this extendable LED light device.

As discussed above in connection with FIG. 7, a sensor means of mechanical or electric type and selected from any combination of a photo sensor, motion sensor, timer, manual switch, humidity sensor, smoke sensor, heating sensor, magnetic sensor, or tilt sensor may be included.

Figure 9:
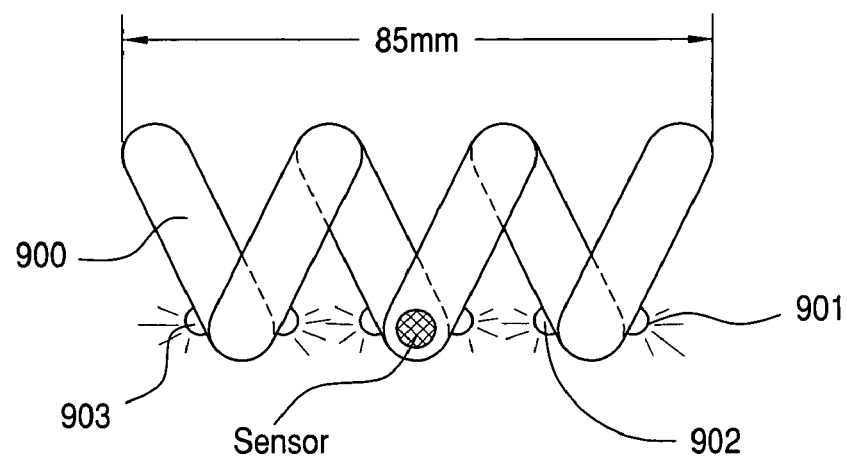
Figure 10:
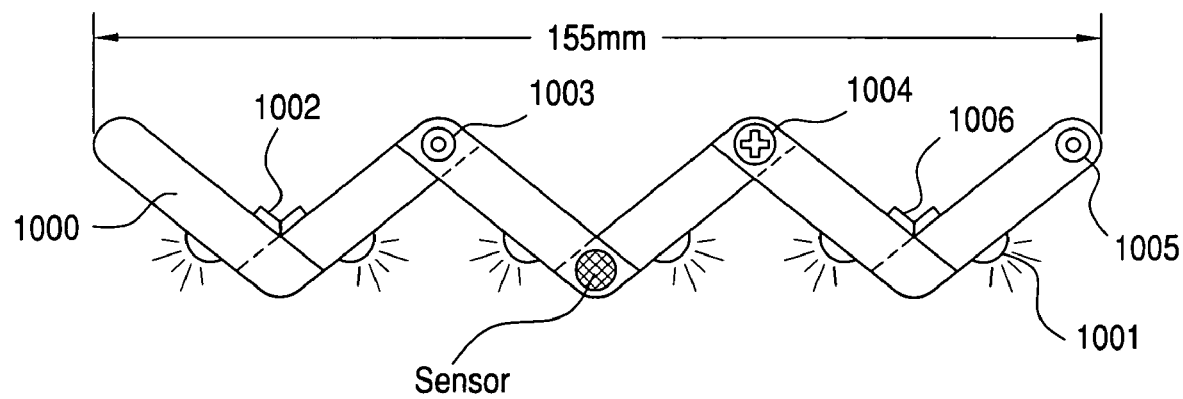

As shown in FIGS. 9 and 10, the LED light device with flexible means of a fourth preferred embodiment has foldable or flexible changing features. As shown in FIG. 10, the device may have an extended length of 155 mm, which is extended from the folded length of only 85 mm as shown in FIG. 9. The preferred connector-means may include a hinge (1002) (1006), rivet (1003), special screw (1004), or nuts (1005) as discussed above but is not limited thereto. Instead, the connector-means may include any equivalent metal or plastic means that provides the housing-unit (1000) with suitable flexible or folded properties. The LED-unit (1001) may also be use in connection with the first or second preferred embodiments, which allow the LED-unit to have an adjustable angle and LED light beam to emit light to a desired location. The arrangements discussed above can allow the LED light beam to be adjusted along any of the x-y-z axes as desired.

In the embodiment of FIG. 10, when the power source (not shown) is a battery, good power saving can be achieved by including a motion sensor, photo sensor, or any combination of a switch and sensor means to turn the lights on an doff.

Having described preferred embodiments to show the scope of the current invention, it will be appreciated that any alternative or equivalent functions, arrangement, process, installation, design or the like may still be within the scope of the invention, which is not limited to the above discussed and mentioned details.

The invention claimed is:

1. An LED light device with changeable geometric dimensions, comprising:
   at least two housing units joined together to form a geometric shape selected from the group consisting of linear, elongate, curved, arc, round, semi-round, and three-dimensional shapes, said housing units each having predetermined dimensions, size, color, material, and surface arrangement; and
   at least one connector means for joining said housing units to allow a configuration or dimensions of said light device to be changed, and for delivering electric power from a power source to LEDs in each of the housing units;
   attachment means for attaching the light device to a main object,
   wherein said housing units are adapted to be rearranged in different mutual spacings, positions, and orientations to provide different said configurations and dimensions of said LED light device, said connector means delivering electric power to said LEDs to provide desired illumination effects in each of said different configurations and dimensions of the light device,
   wherein light beams from said LEDs are seen by a viewer to exhibit predetermined light functions, viewing angle, duration, timing, or colors, and
   wherein said light device further has properties selected from the group consisting of rotary, jumpable gap, extendable, foldable, distance changeable, extractable, connectable, disconnectable, extendable, retractable, expandable, addable, adjustable, bendable, overlapable, underlayable, assembleable, disassembleable, and flexible properties.

2. An LED light device as claimed in claim 1, wherein said LED light device further includes an integrated circuit, sensor means, and switch means.

3. An LED light device with changeable geometric dimensions, comprising:
   an LED in at least two housing units joined together by at least one connector means for joining said housing units to allow a configuration and dimensions of said light device to be changed by changing mutual spacing, positions, or orientations of said housing units, and for delivering electric power from a power source to LEDs in each of the housing units in order to provide desired illumination effects in each of the different configurations and dimensions of the light device; and
   attachment means for attaching the light device to a main object.

4. An LED light device as claimed in claim 3, wherein said LED light device further includes an integrated circuit, sensor means, and switch means.

* * * * *